July 1, 1930.  B. HENNING  1,768,954
PIE PAN ATTACHMENT
Filed Feb. 24, 1930
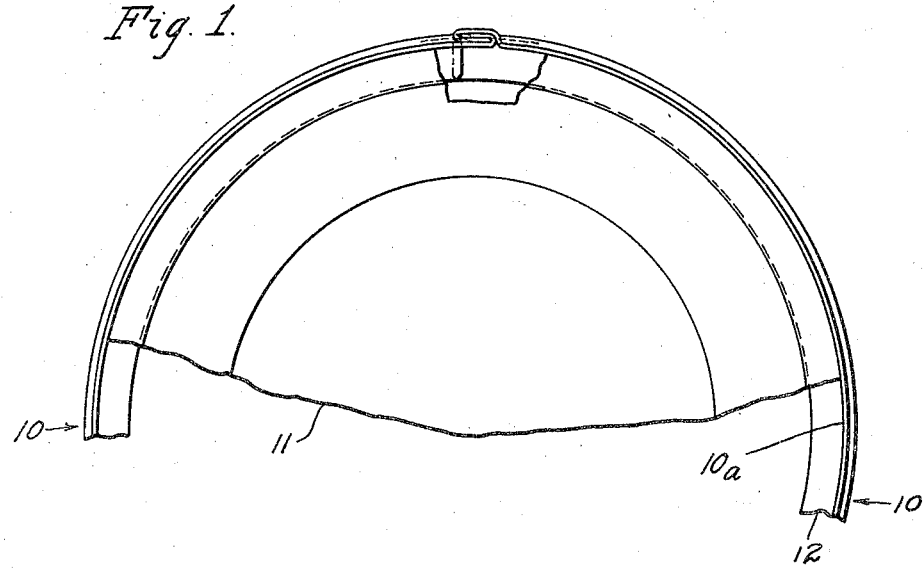
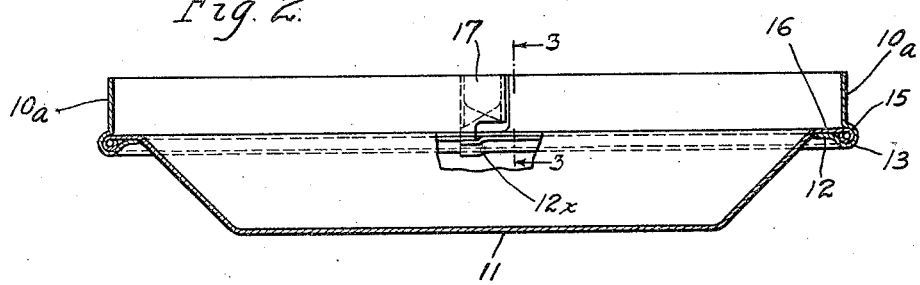
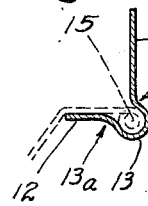 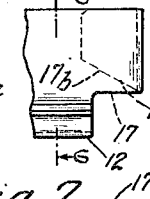 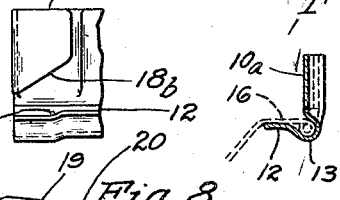 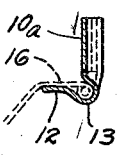
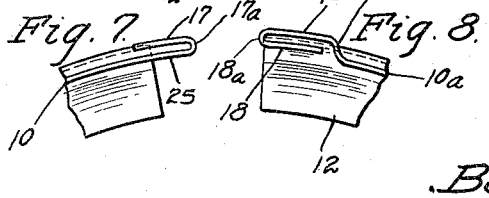
INVENTOR.
Bessie Henning
BY Robt. H. Pearson
ATTORNEYS.

Patented July 1, 1930

1,768,954

UNITED STATES PATENT OFFICE

BESSIE HENNING, OF LOS ANGELES, CALIFORNIA

PIE-PAN ATTACHMENT

Application filed February 24, 1930. Serial No. 430,799

This invention relates to an attachment adapted to be removably secured to cooking utensils used in baking. More particularly the invention pertains to a protecting and retaining ring adapted to be removably attached to a pie pan to prevent the filling of the pie from running over the edge portion of the pan while the pie is being cooked.

An object of the invention is to simplify a pie-protecting device of this kind; to render it more conveniently applicable to and removable from the pie pan; and to generally improve upon the construction of a device of the kind to which the invention pertains.

Another object of the invention is to provide a protecting device of the kind stated which will, in conjunction with other improved features, prevent the outer edge portion of the pie crust from being scorched while baking.

Other objects, advantages and features of invention may hereinafter appear.

Referring to the accompanying drawings which illustrate what is at present considered to be a preferred embodiment of the invention, Fig. 1 is a plan view of a pie pan having my newly invented attachment secured thereto in position for use, a portion of the pan and attachment being broken away to contract the view.

Fig. 2 is a vertical mid-section of the pan with the attachment secured thereto.

Fig. 3 is a section on line 3—3 of Fig. 2, the relation of the pan to the attachment being indicated in dotted lines.

Fig. 4 is an inside elevational view of one end portion of the pie retaining ring and Fig. 5 is a like elevational view of the other end portion of said ring.

Fig. 6 is a section on line 6—6 of Fig. 4.

Fig. 7 is a plan view of the ring end shown in Fig. 4.

Fig. 8 is a plan view of the ring end shown in Fig. 5.

Referring in detail to the drawings, the pie protecting attachment consists of an annular member 10 preferably formed of a sheet metal strip, and being of a size to fit closely around the circular pie pan 11.

Said ring 10 comprises a body or upstanding port $10^a$ and an inwardly directed bottom flange 12 which is shown united to the body portion of the ring by a swell or outcurved portion 13 which is adapted to fit closely around the curl 15 of the pie pan flange 16. As well shown in Fig. 6 said outcurved portion or bead 13 is contracted at each side at $13^a$ to such an extent that it springs apart slightly when snapped over the curl 15 of the pan 11. For this purpose said bead is so shaped that, as well seen in Fig. 6, the internal distance across its neck portion $13^a$ is less than the internal diameter of its rounded out-curved portion 13. This construction, in conjunction with the interlocking feature hereinafter described, insures a fluid tight dependable fit of the ring 10 around the pan 11.

The annular member 10 is illustrated as a sheet metal strip which is curved to adapt it to conform to the periphery of the pie pan 11. One end of said strip is provided with a rebent tongue 17 and the other end portion thereof is provided with a tongue 18 which is rebent in the opposite manner to the tongue 17 in order that these two tongues may be interlocked with each other to secure the ring 10 in the operative position shown in Figs. 1 and 2.

Said tongues 17 and 18 are formed only upon the body portion $10^a$ of the strip 10, that is to say, upon the vertical part thereof as viewed in Fig. 2. Moreover each of these tongues is preferably bevelled along its lower edge as shown, the tongue 18 being provided with a bevel $18^b$ and the tongue 17 being provided with a bevel $17^b$. One end portion of the strip 10 is provided with an offset portion 19, united to the body of the strip by a bend 20, upon which the rebent tongue 18 is formed. The other end portion of the strip is provided with a straight extension 25 which is nearly as wide as the body portion of the vertical part of the strip, and the rebent tongue 18 is formed upon this extension. It is necessary to provide said extension 25 at one end of the body part $10^a$ of the strip 10 in order that flange 12 will not be in the way when the rebent tongues are to be interlocked with each other, because the tongue 18 must be brought up from a point beneath the tongue 17 and thus interlocked therewith in an edgewise manner.

The rebent portion 17 is united to the adjacent end of the strip by a bend 17ª, and the rebent portion 18 is united to the tongue portion 19 by a bend 18ª, these bends 17ª and 18ª being of the right size to provide proper spaces into which the tongues 17 and 18 may fit.

After the pie has been placed in the pan preparatory to baking and the edges thereof have been trimmed, the strip 10, with its ends spaced a short distance apart, is positioned around the periphery of the pie pan, the horizontal flange 12 of the device being brought up against the lower side of the pie pan flange 16. Then the end portions of the device are drawn together and interlocked in an edgewise manner, the tongue 18 being brought up beneath the tongue 17, with rim roll 13ᵇ of the pie pan fitting into the beading 13.

The bottom flange 12 of the device is slightly offset at 12ˣ near one end thereof thus providing for a smooth fitting together of the slightly overlapped ends of the device when it is in place around the pie pan. This construction effectually prevents leakage of the pie filling at this point.

Claims:

1. An attachment for pie pans comprising a strip of sheet metal which is curved to adapt it to conform to the periphery of a circular pie pan, one end of said strip being provided with a tongue which is rebent toward one side thereof and the other end of said strip being provided with a tongue which is rebent towards the opposite side of said strip, said tongues being adapted to interlock with each other to grip a pie pan closely within said strip.

2. An attachment for pie pans comprising a strip of sheet metal which is curved to adapt it to conform to the periphery of a circular pie pan, one end of said strip being provided with a tongue which is rebent toward one side thereof and the other end of said strip being provided with a tongue which is rebent towards the opposite side of said strip, said tongues being adapted to interlock with each other to grip a pie pan closely within said strip, said curved strip being provided with an inwardly directed flange along one edge thereof adapted to underlie the periphery of the pie pan, said inwardly directed flange being cut away to permit the aforementioned rebent tongues to be interlocked in an edgewise manner.

3. An attachment for pie pans comprising a strip of sheet metal which is adapted to conform to the periphery of a pie pan, one end of said strip being radially offset and each end of said strip having a rebent tongue formed thereon, said tongues being adapted to interlock with each other, and the tongue which is formed on the offset end portion of the strip being directed toward the inner side of said offset portion, while the other tongue is rebent in the opposite direction, said tongues being adapted for edgewise movement into an interlocking position.

4. An attachment for pie pans comprising a strip of sheet metal which is adapted to conform to the periphery of a pie pan, said strip being provided with a flange united to one edge thereof by means of an out-curved bead, said bead having a contracted neck portion adapted to be sprung tightly over the peripheral portion of a pie pan having a curl extending therearound, the internal distance from side to side of said neck portion being normally less than the internal diameter of said bead.

5. An attachment for pie pans comprising a strip of sheet metal which is curved to adapt it to conform to the periphery of a pie pan, one end of said strip being provided with a tongue which is rebent toward one side thereof and the other end of said strip being provided with a tongue which is rebent towards the opposite side of said strip, said tongues being adapted to interlock with each other to grip a pie pan closely within said strip.

In testimony whereof I hereunto affix my signature.

BESSIE HENNING.